Patented Aug. 7, 1951

2,562,948

UNITED STATES PATENT OFFICE 2,562,948

THIOCYANOPHENOLS

Thomas E. Robbins, Jr., Pittsburgh, and William H. Hill, Mount Lebanon, Pa., assignors to Koppers Company, Inc., Pittsburgh, Pa., a corporation of Delaware No Drawing. Application November 1, 1947, Serial No. 783,610

11 Claims. (Cl. 260—454)

This invention relates to thiocyanophenols. More particularly the invention relates to nitrothiocyanophenols and the process of making the same.

It has been known that phenol can be thiocyanated by a number of processes, such as the so-called "Copper Thiocyanate Process."

According to this process 48 grams of ammonium thiocyanate in 60 cc. of water is mixed with 9.4 grams of phenol, the solution being maintained at a temperature of about 55° C. With continuous stirring 2.6 grams of concentrated sulphuric acid in 20 cc. of water is added and immediately thereafter 50 grams of crystalline copper sulphate dissolved in 150 cc. of water is added to the solution drop by drop. The warm reaction mixture is then mixed with 100 cc. of benzene, stirred vigorously, and filtered. The benzene layer in the filtrate is removed and the aqueous filtrate and precipitate are separately extracted with further portions of benzene. The combined benzene extracts are then dried and treated with activated charcoal and filtered. The benzene is evaporated at room temperature to produce a yellow, flaky crystalline mass. These crystals are then recrystallized one or more times from a mixture of equal parts of benzene and cyclohexane to produce a colorless, needlelike crystalline body, 4-thiocyanophenol, having the following structure:

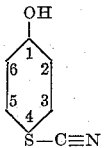

Certain substituted thiocyanophenols are most advantageously prepared by the Kaufmann method from the corresponding substituted phenols. According to this process one mole of a phenol together with a large excess of sodium thiocyanate (more than 2 moles) is dissolved in glacial acetic acid or methanol saturated with sodium bromide. The mixture is cooled to a temperature of 0° C. to 5° C. and a solution of one mole of bromine in glacial acetic acid is added to the mixture. The bromine is added drop by drop so that the addition is distributed over a period of 30 to 90 minutes, with the solution being stirred continuously. The mixture is then allowed to stand for 10 to 15 hours at a temperature of about 0° C. to complete the reaction. The whole mixture is then stirred with about five times its volume of cold water and the thiocyanophenol separated either as an oil or as a solid. The thiocyanophenol thus obtained is further purified by recrystallization from an appropriate solvent.

We have discovered that thiocyanophenols such as the above may be substituted in the benzene ring to form nitrothiocyanophenols. Further, we have found that nitrothiocyanophenols may be prepared having additional ring substituents, such as aryl and alkyl groups and halogens.

The primary object of the present invention is to provide new products, such as nitrothiocyanophenols, and a process for making the same.

Another object of the invention is to provide new products, such as ring-substituted nitrothiocyanophenols, in which substituents, such as alkyl and aryl radicals and halogens are attached to the ring in addition to one or more nitro-groups.

A further object of the invention is to provide a process for the introduction of halogen into the nitrothiocyanophenols.

With these and other objects in view the invention comprises nitrothiocyanophenols and the process of making the same, as hereinafter described and particularly defined in the claims.

Parent materials useful in the production of the nitrothiocyanophenols of our invention are, for instance, 4-thiocyanophenol, 2-methyl-4-thiocyanophenol, 3,5-dimethyl-4-thiocyanophenol, 2-methyl-6-isopropyl-4-thiocyanophenol, 4-thiocyano-2-ethylphenol, 4-thiocyano-3-ethylphenol, 4-thiocyano-2-sec-butylphenol, 4-thiocyano-2-amylphenol, 4-thiocyano-2-cyclohexylphenol, 4-thiocyano-2-phenylphenol, 2-chloro-4-thiocyanophenol, and others. They are described and many of them are claimed in our co-pending application, Serial No. 783,609, filed November 1, 1947.

As an example of our process 4-thiocyanophenol may be nitrated in the following manner: 15 grams of 4-thiocyanophenol dissolved in 100 grams of glacial acetic acid and 25 grams of acetic anhydride is cooled to 0° C. to 5° C. While this mixture is continuously stirred a solution of 6.7 grams of fuming nitric acid dissolved in 10 grams of glacial acetic acid is slowly added to the thiocyanophenol solution while the temperature is maintained below 5° C. The nitric acid is slowly added over a period of one hour and the mixture is allowed to stand. About half an hour after the addition of nitric acid a yellow solid begins to form and the temperature of the reaction mixture rises. Stirring is continued for a period of 30 minutes after the solid precipitate appears during which time the temperature will again fall to below 5° C. 600 cc. of cold water is added to the reaction mixture and the mixture brought to a temperature of 0° C. and allowed to stand for 10 to 15 hours. The reaction will be completed by this time and the yellow solid crystalline material is separated by filtration and then air dried. The solid precipitate is a yellow, flaky crystalline material. After several recrystallizations from cyclohexane yellow leaflets are obtained melting at 80° to 81° C. They are soluble in methanol, ethanol, ether, acetone and benzene, sparingly soluble in cyclohexane and carbon tetrachloride, and insoluble in water and petroleum ether. This compound has the following structural formula:

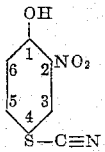

Other thiocyanophenols, such as those discussed above, may be nitrated using the same process as outlined for the nitration of 4-thiocyanophenol.

Nitrothiocyanophenols made according to our invention may be further substituted, for instance, by halogen. A method for such halogenation is described in our co-pending application, supra.

Further substitution by sulfonation, for instance, is readily accomplished by treating the nitrothiocyanophenols with sulfuric acid of moderate concentration at moderate temperatures.

When nitrating thiocyanophenols, such as halogenated or alkylated or arylated thiocyanophenols, the stoichiometric quantity of nitric acid suitable for making a mononitro-compound is used in the reaction if the mononitro-compound is desired. The $NO_2$ group usually unites with the carbon atom of the benzene ring in an ortho position to the —OH group, provided such position is unsubstituted. If the dinitro-compound is desired, a correspondingly larger quantity of nitric acid is used.

The following are some of the physical properties of the nitrothiocyanophenols which have been produced in accordance with the preferred process of the invention:

6-nitro-2-methyl-4-thiocyanophenol forms bright yellow, needle-like crystals having a melting point of 79.8° to 80.8° C. The crystals are soluble in methanol, ethanol, ether, acetone, benzene, sparingly soluble in cyclohexane and carbon tetrachloride, and insoluble in water and petroleum ether.

2-nitro-3,5-dimethyl-4-thiocyanophenol forms fine crystals of a light tan color, melting at 186.5° to 187.5° C. The crystals are soluble in ethanol, methanol, acetone, ether and hot benzene, sparingly soluble in cyclohexane and carbon tetrachloride, and insoluble in water.

6-nitro-2-chloro-4-thiocyanophenol forms fine-grained, bright yellow, needle-like crystals, melting at 86.8° to 87.8° C. The crystals are soluble in methanol, ethanol, acetone, ether and benzene, sparingly soluble in cyclohexane and carbon tetrachloride, and insoluble in water.

2-nitro-3-methyl-6-isopropyl-4-thiocyanophenol forms pale yellow, rhombic crystals having a melting point of 80.6° to 81.4° C., the crystals being soluble in methanol, ethanol, acetone, ether, benzene and cyclohexane, sparingly soluble in petroleum ether, and insoluble in water.

2(6)-nitro-3-methyl-4-thiocyanophenol forms light tan crystals melting at 150.8° to 151.6° C. The crystals are soluble in methanol, ethanol, acetone, ether and benzene, sparingly soluble in cyclohexane and carbon tetrachloride, and insoluble in water.

2-nitro-6-bromo-4-thiocyanophenol forms a light yellow, crystalline solid having a melting point of 91° to 95° C. The crystals are soluble in methanol, ethanol, acetone, ether and benzene, sparingly soluble in cyclohexane and carbon tetrachloride, and insoluble in water.

2-nitro-6-bromo-3,5-dimethyl-4-thiocyanophenol forms a light cream colored, crystalline solid having a melting point of 155.5° to 156.5° C. The crystals are soluble in methanol, ethanol, ether and benzene, sparingly soluble in cyclohexane, and insoluble in water.

The nitrothiocyanophenols are toxic and effective as pest control agents. Some of the compounds are effective as pickling inhibitors for steel pickling, especially after conversion to sulfonic acids. Most of them are useful as intermediates in the manufacture of dyestuffs. With reference to the pest control agents it has been found in general that loading of the molecules with many substituents is not desirable, a monomethyl nitrothiocyanophenol, for instance, being better than a dimethyl nitrothiocyanophenol.

Since all aromatic compounds containing OH-groups are referred to broadly as phenols, we want it understood that our invention is not restricted to compounds of the benzene series, nor to compounds carrying only one OH-group. Homologs containing more than one ring and/or more than one hydroxy group like thiocyano derivatives of hydroxynaphthalene, hydroxyanthracene, hydroxyphenanthrene, the dihydroxybenzenes, alizarine and many others may serve as parent substances in the manufacture of the compounds of our invention. For these reasons the broad term "thiocyanohydroxyaromatic compound" will be used in the claims.

The preferred form of the invention having been thus described, what is claimed as new is:

1. A process of producing nitrothiocyanohydroxyaromatic compounds comprising: treating thiocyanohydroxyaromatic compounds in acetic acid solution with fuming nitric acid at a temperature of 5° to 0° C.

2. The process defined in claim 1 in which the thiocyanohydroxyaromatic compounds are dissolved in a mixture of glacial acetic acid and acetic anhydride.

3. The process defined in claim 1 in which the nitric acid is a fuming nitric acid dissolved in glacial acetic acid.

4. The process defined in claim 1 in which the thiocyanohydroxyaromatic compounds are ring-substituted.

5. 2-nitro-4-thiocyanophenol.

6. The process of producing nitrothiocyanohydroxy aromatic compounds as defined in claim 1 in which the thiocyanohydroxy aromatic compounds are ring-substituted, the substituent being one or more of the group consisting of chlorine, bromine, the phenyl group, the cyclohexyl group, and alkyl groups containing not more than five carbon atoms.

7. As a new compound, a para-thiocyano phenol having the general formula

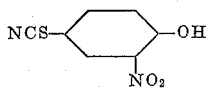

wherein the aromatic nucleus may bear further substituents selected from the class consisting of bromine, chlorine, the phenyl group, the cyclohexyl group, and alkyl groups containing not more than five carbon atoms.

8. 6-nitro-2-methyl-4-thiocyano phenol having a melting point of 79.8° to 80.8° C.

9. 6-nitro-2-chloro-4-thiocyano phenol having a melting point of 86.8° to 87.8° C.

10. 2 - nitro - 3 - methyl - 6 - isopropyl - 4-thiocyano phenol having a melting point of 80.6° to 81.4° C.

11. 2 - nitro - 6 - bromo - 4 - thiocyano phenol having a melting point of 91° to 95° C.

THOMAS E. ROBBINS, Jr.
WILLIAM H. HILL.

REFERENCES CITED

The following references are of record in the file of this patent:

UNITED STATES PATENTS

| Number | Name | Date |
|---|---|---|
| 2,024,098 | Heckert | Dec. 10, 1935 |

FOREIGN PATENTS

| Number | Country | Date |
|---|---|---|
| 122,569 | Germany | July 17, 1901 |

OTHER REFERENCES

Challenger et al.: "Jour. Chem. Soc. (London)," vol. 125, (1924), pp. 1377–1381.

Challenger et al.: "Jour. Chem. Soc. (London)," vol. 129 (1928), pp. 1364–1375.

Weygand: "Organic Preparations," (Interscience Publishers, New York city, 1945), pp. 280–282.